United States Patent

[11] 3,588,802

| [72] | Inventor | William Edward Lerwill |
| | | Keston, Kent, England |
| [21] | Appl. No. | 789,584 |
| [22] | Filed | Jan. 7, 1969 |
| [45] | Patented | June 28, 1971 |
| [73] | Assignee | Seismograph Service Corporation |
| | | Tulsa, Okla. |
| [32] | Priority | Jan. 9, 1968 |
| [33] | | Great Britain |
| [31] | | 1276/68 |

[54] WAVE ENERGY SOURCE LOCATION BY AMPLITUDE AND PHASE MEASUREMENT
14 Claims, 16 Drawing Figs.

[52] U.S. Cl. .................................................. 340/15.5SC,
324/67, 340/15.5VD, 340/15.5DS,
340/16P, 343/112D
[51] Int. Cl. ...................................................... G01s 3/80,
G01v 1/30
[50] Field of Search ........................................... 340/15.5
(DISP, RSC), 6, 16; 343/112.3

[56] References Cited
UNITED STATES PATENTS

| 2,275,735 | 3/1942 | Cloud .......................... | 340/15.5 |
| 2,349,370 | 5/1944 | Orner .......................... | 340/16 |
| 3,400,363 | 9/1968 | Silverman ..................... | 340/15.5X |
| 3,467,216 | 9/1969 | Massey ........................ | 181/0.5 |

Primary Examiner—Rodney D. Bennett, Jr.
Assistant Examiner—Daniel C. Kaufman
Attorney—Mason, Kolehmainen, Rathburn and Wyss ABSTRACT: Real or virtual sources of single frequency radiation are located by charting the amplitude and relative phase of the radiations passing through a plane surface, and by then analyzing the resultant chart. In seismic exploration, virtual sound sources are created below interfaces by a single frequency mechanical vibrator, and the reflected sound waves are charted. Noise problems are overcome with high Q filtering and correlation processing techniques. The use of single frequency excitation source makes it possible to chart the sound radiations at a leisurely rate with a single sound detection unit, and allows determination of the slant of subterranean interfaces as well as the depth of the interfaces.

Patented June 28, 1971

INVENTOR:
WILLIAM EDWARD LERWILL

ATT'YS

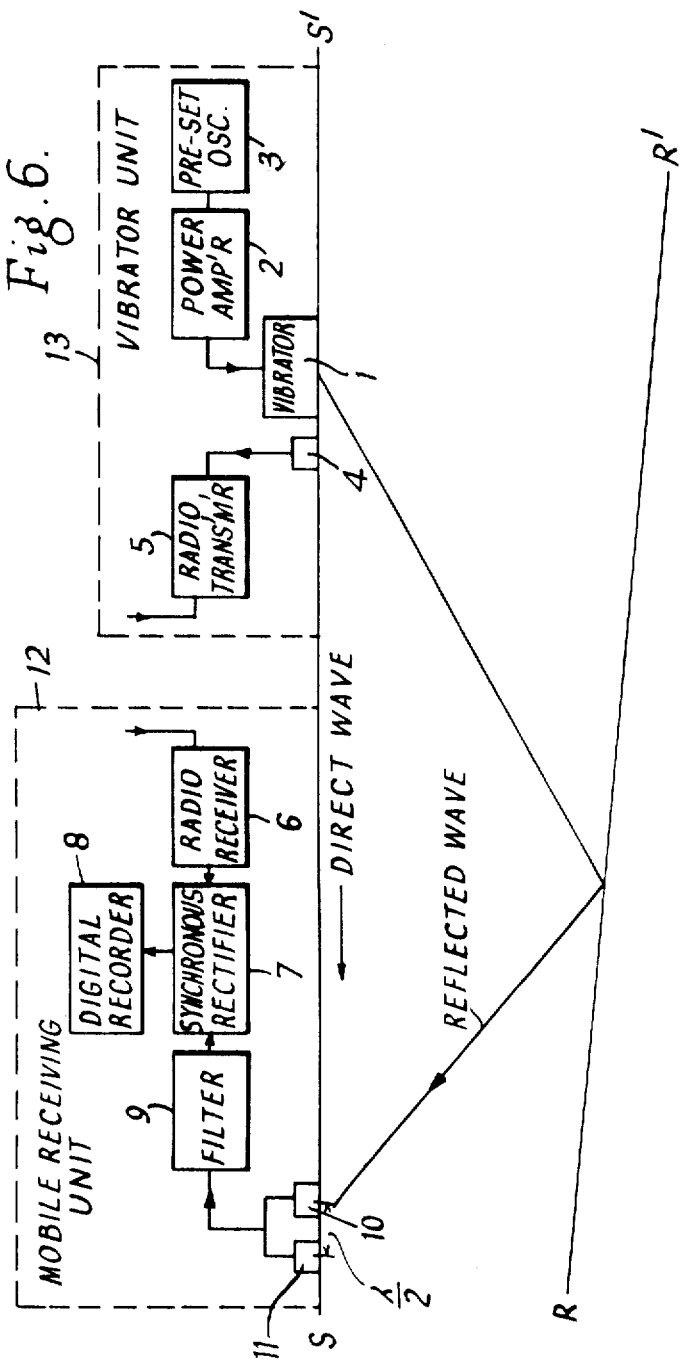

INVENTOR:
WILLIAM EDWARD LERWILL

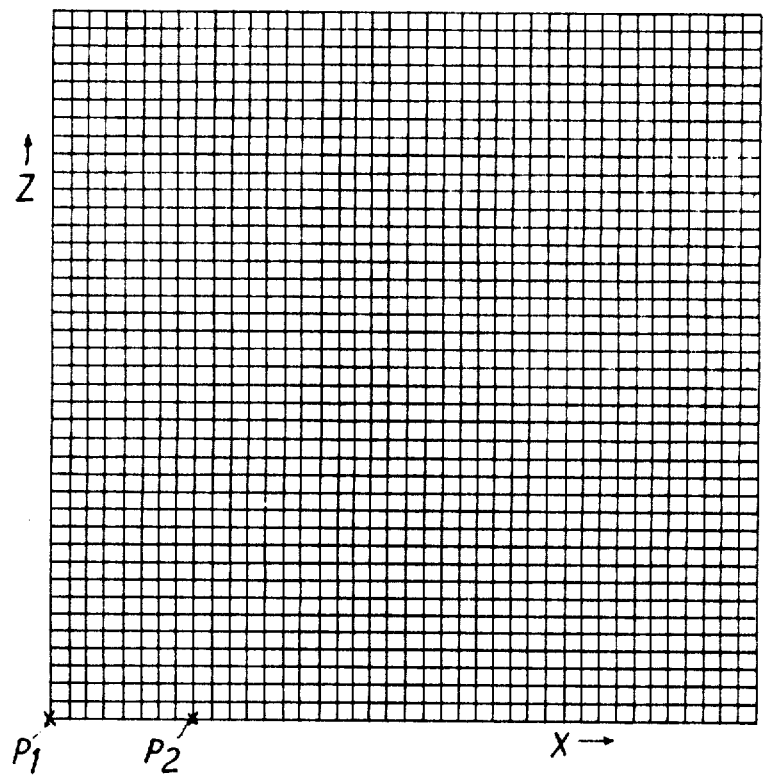

INVENTOR:
WILLIAM EDWARD LERWILL

Patented June 28, 1971

Patented June 28, 1971 3,588,802
10 Sheets-Sheet 9
Fig.13.
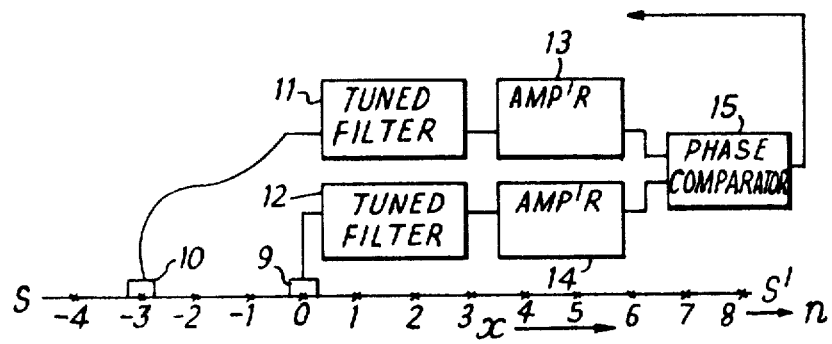
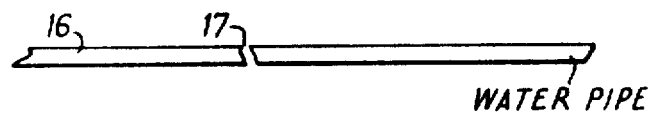
Fig.14.
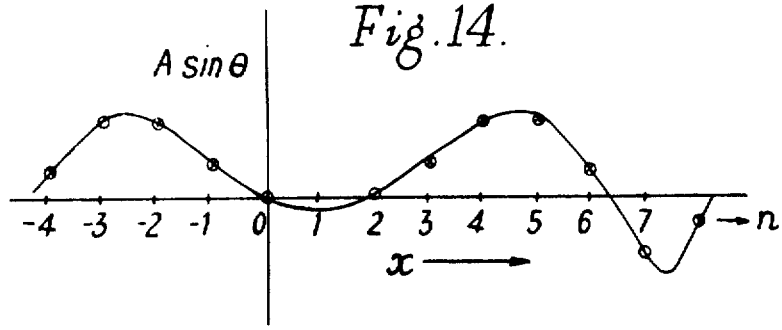
INVENTOR:
WILLIAM EDWARD LERWILL
ATT'YS 3,588,802

WAVE ENERGY SOURCE LOCATION BY AMPLITUDE AND PHASE MEASUREMENT

FIELD OF INVENTION

This invention relates to methods of position-finding and ranging by means of a transmitted wave. The invention includes position finding by echo-sounding. The method is of particular value in Seismic exploration.

SUMMARY OF PRIOR ART

It is conventional practice in echo ranging to measure the travel time between transmitting a pulse and receiving the echo in order to compute distance. The pulse may be expanded to a swept-frequency (or a coded signal of sufficient bandwidth) in order to increase the effective power of the transmitter. However, all of these signals are of relatively transient duration.

In seismic exploration, for an example, the transmitted pulse is normally generated by an explosive charge near the surface. Usually it is preferred to lay a line of detectors on the surface so that as much information as possible is obtained from the charge. The use of a multiplicity of detectors is necessary to obtain the maximum coverage of an area of subsurface in a given time. This also applies to exploration methods where the transmitted pulse is an expanded signal. Thus a necessary feature of seismic exploration using a transient signal is the array of detectors positioned over a wide area.

With all methods of seismic exploration it is normal practice to construct a chart representing a cross section of the subsurface showing the travel times (or depths) to the reflecting interfaces. A cause of error in the cross section is due to the assumption that all events represent vertical travel times between the pulse generator and reflectors. Reflections arriving from interfaces dipping in a direction transverse to the spread direction will show a travel time appropriate to the shortest path. No information will be given by the return signal on the angle or direction of transverse dip of the strata.

A limitation in the use of a transient pulse is that the received echo must be substantially greater in amplitude than random pulses in the same frequency spectrum. It is therefore necessary for the explosive charge to produce sufficient energy to overcome the masking effect of background noises. An explosive charge will usually be of 10 to 100 lbs. of dynamite.

If a swept frequency signal is used it must have a total energy output substantially the same as that of the explosive charge. An electromechanical or hydraulic vibrator must be driven through a range of frequencies and deliver a suitable power output throughout the band. Such vibrators are expensive and require careful maintenance.

The object of this invention is to provide method and apparatus of ranging or echo-sounding utilizing a signal of constant frequency.

The invention provides a method of detecting a source which can be virtual or real, emitting a constant signal containing a constant frequency. The standing wave set up by the source is then surveyed. When a real source is being studied no auxiliary sources are necessary. However if echo-sounding is being performed and the energy reflected from a virtual source is being studied then an auxiliary source is required. This auxiliary source emits a signal which is reflected so as to appear to be emitted from the virtual source.

When the method is used in seismic exploration an auxiliary source is positioned in the area to be surveyed to direct acoustic energy into the earth and then the standing wave distribution at the surface is measured.

The energy required will not necessarily be less than when a transient signal is used but will be obtained more efficiently because a constant frequency is used. The losses in a resonant transmitter are lower than those in the broadband equivalent.

The reflected signal being a standing wave pattern may be examined at leisure. In the case of seismic exploration, the observer is able to move around the prospect area and study the wave front in detail.

The reflected signal is a sine wave of constant frequency. This means we are able to separate the signal from noise with an extremely narrow-band filter, the selectivity being proportional to the length of time spent in taking a reading. Thus a reading taken over a period of time will give a good signal/noise ratio.

The invention further provides a method of determining the position in a medium of a source of spherical waves emitting a continuous signal containing a constant frequency in which the instantaneous amplitude of the spherical wave is measured at observation points along a line of traverse with the aid of a reference signal containing the constant frequency and then determining the source position from the values of the instantaneous amplitude along the line, and a method in which the measurements are made over an area.

The method using an array of points will be used if, with a single source, there is doubt of the polarity of the position i.e. the three dimensional position is not certain.

The reference signal must retain its constant frequency and phase over the travel time.

The pattern set up at the observation points will be an interference pattern when there are a multiplicity of sources.

It will be appreciated that the reference signal can be obtained from another observation point or an auxiliary source which preferably emits a constant frequency wave.

DESCRIPTION OF PREFERRED EMBODIMENTS

Examples of the method and apparatus of the invention will now be described with reference to the accompanying diagrammatic drawings in which:

FIG. 3 shows the variations in wave parameters at the surface,

Figure 4:
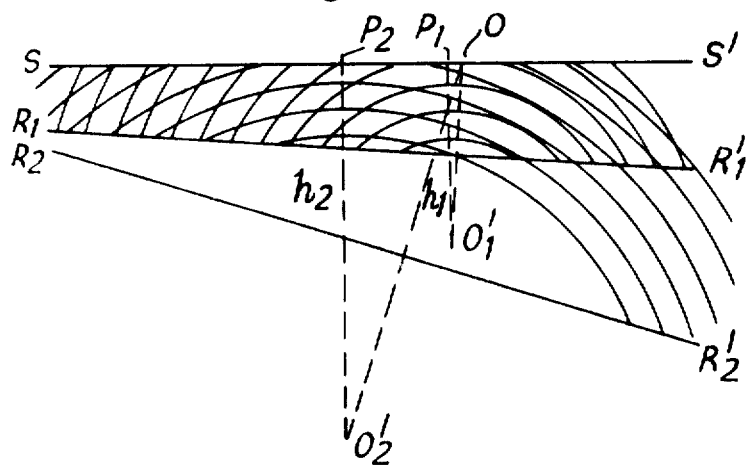
Figure 5:
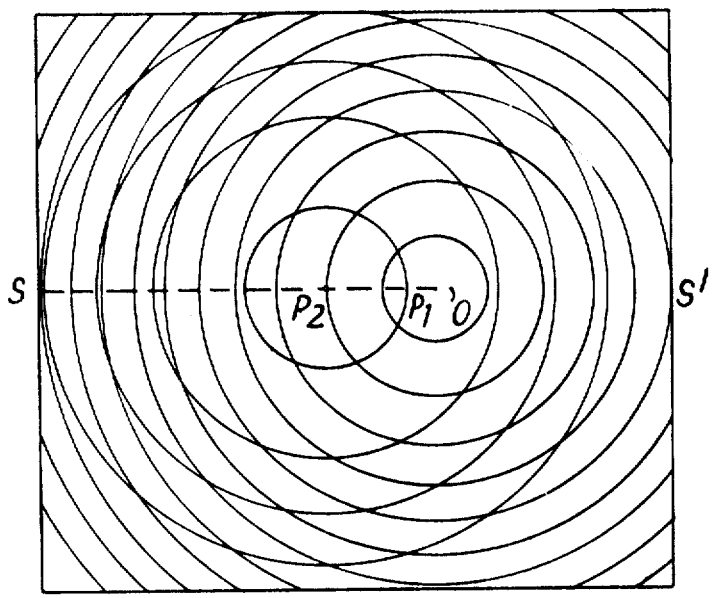
Figure 8:
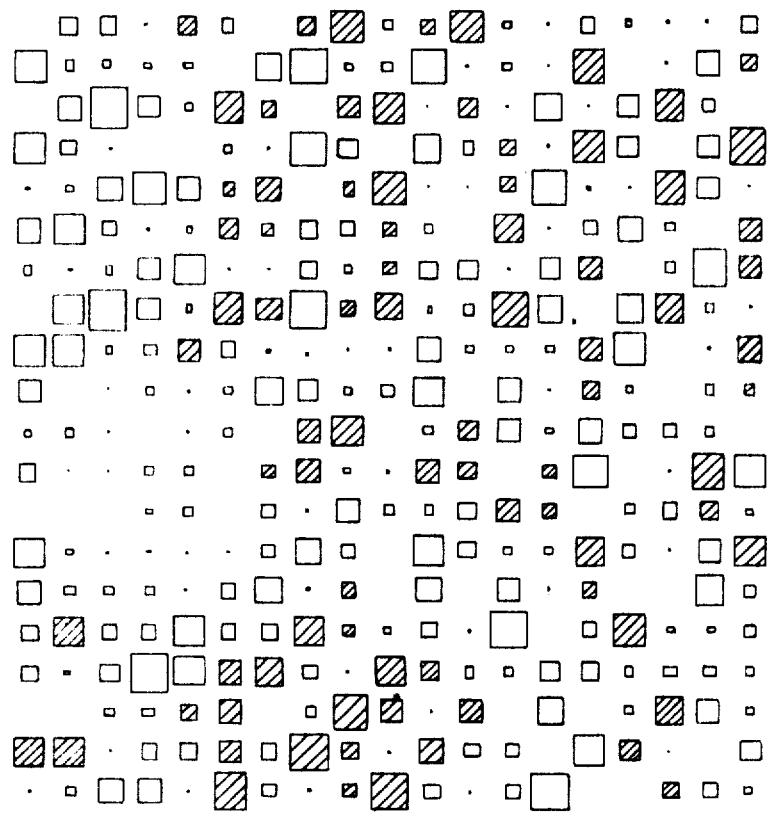
Figure 9:
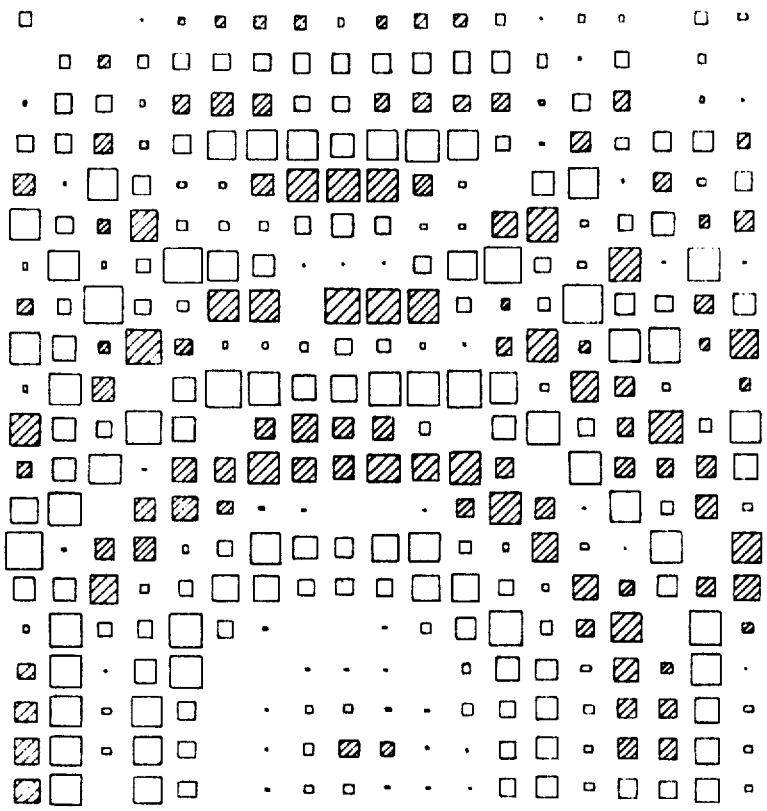
Figure 10:
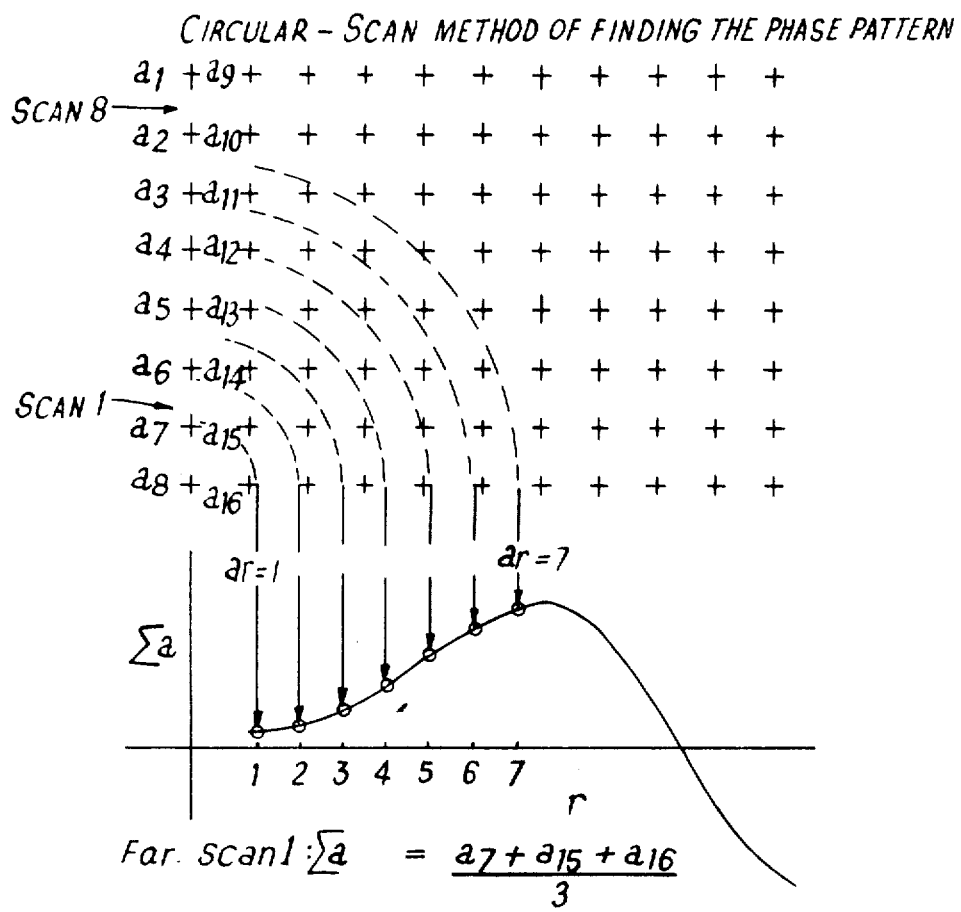
Figure 11:
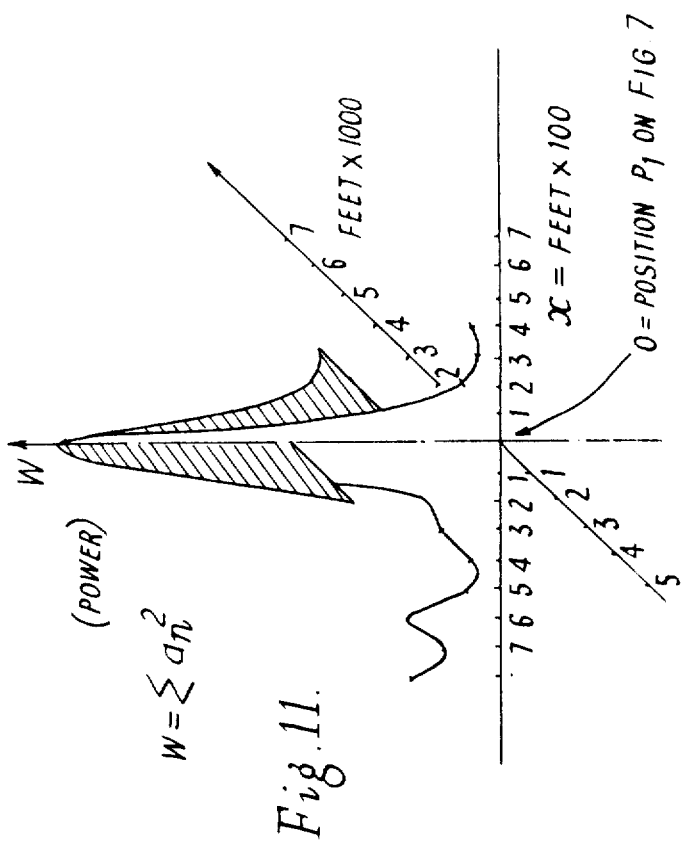
Figure 12:
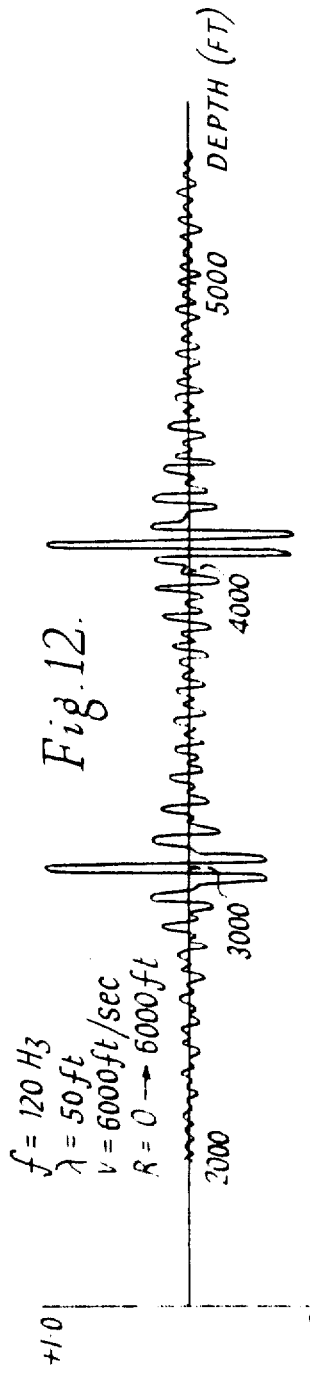
Figure 15:
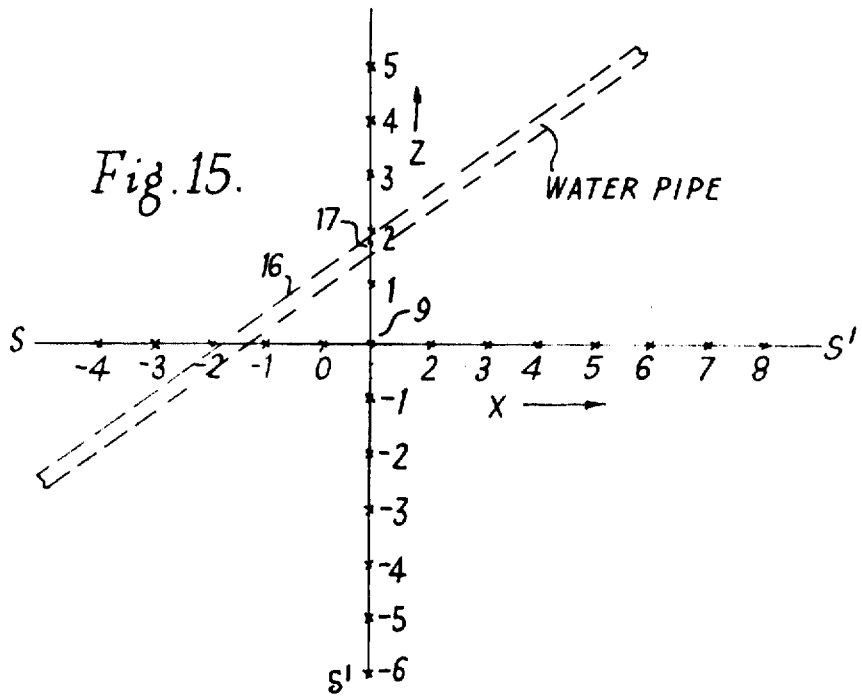
Figure 16:
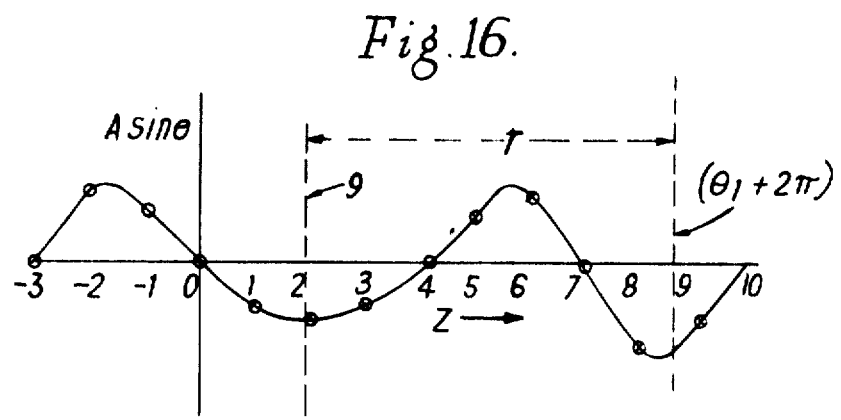

FIG. 4 is a vertical section showing reflection of a wave front from two surfaces, FIG. 5 is a view of the plane surface SS' of FIG. 4 from above, FIG. 6 shows an apparatus for use in the method applied to seismic exploration, FIG. 7 shows a grid for the insertion of instantaneous amplitudes at observation points on an array, FIGS. 8 and 9 show representations of the values of instantaneous amplitudes over an array, FIG. 10 shows the method of performing a circular scan, FIG. 11 shows the derivation of a power value, FIG. 12 shows the correlogram of a seismic exploration, FIG. 13 shows an apparatus for use in the position determination of a real source, FIG. 14 shows a representation of the information derived from the apparatus of FIG. 13, FIG. 15 shows a plan view of the observation points and FIG. 16 shows another representation of the type shown in FIG. 14.

Figure 1:
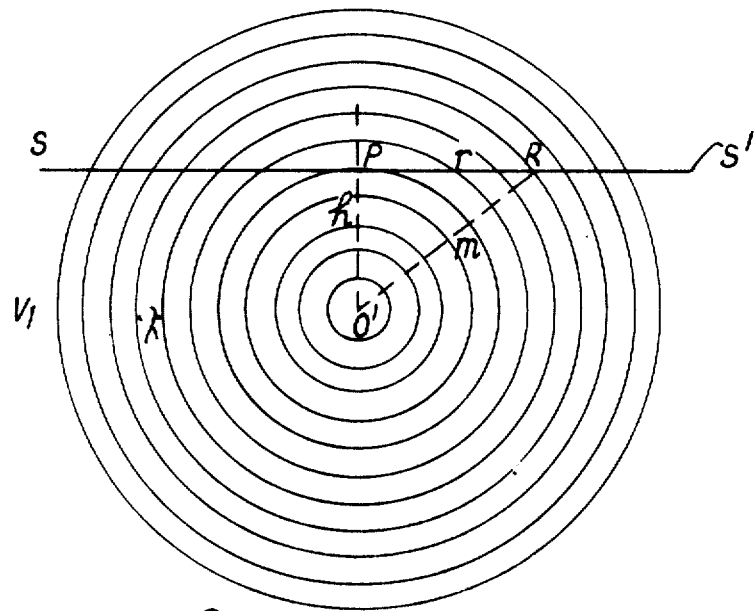
FIG. 1 is a vertical section through a plane surface and a source.
Figure 2:
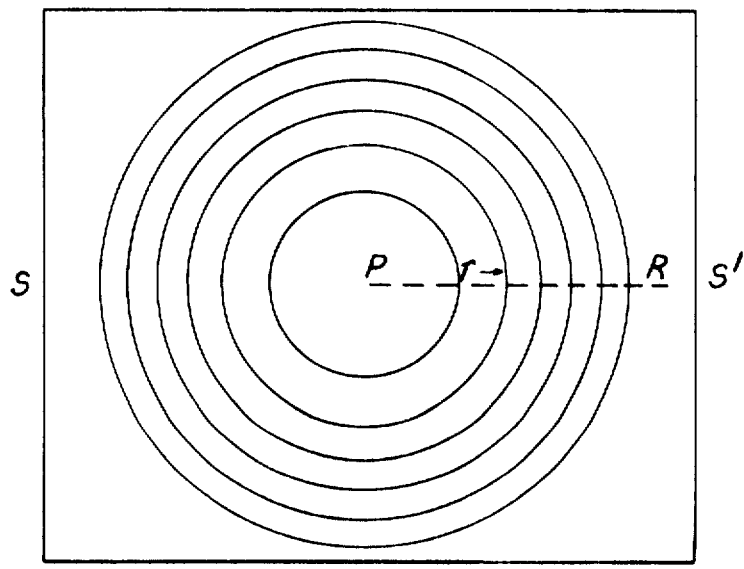
FIG. 2 is a view of the plane surface of FIG. 1 from above.

Reference is now made to FIGS. 1 and 2 which illustrate the waveform emitted from a source O' which is a distance $h$ below the ground surface SS'. The waveform is spherical and is represented by equidistant concentric rings. The point P lies on the surface and a line normal to the surface passes through the points P and O'. When viewed from above (see FIG. 2) the concentric rings represent lines having equal instantaneous amplitude and phase. The continuous variations of amplitude and phase along the line $r$ are shown in FIG. 3 with the waveform emanating from the origin which is the point P. Hereafter this waveform will be referred to as a phase-distance waveform.

The pattern on FIG. 2 and the waveform on FIG. 3 will be appropriate for only one value of the distance $h$. There is a 180° ambiguity because in theory the distance $h$ may be above the surface, however, this ambiguity can be resolved by examining the answers and rejecting one of them. The relationship between the variables in the FIGS. will now be considered.

The line SS' on FIG 1 represents the edge of a plane surface placed in the path of the wave. Point P is on a line perpendicular to the surface SS' and passing through the source point O'

The distances $h$ and $r$ are related by $$m = (h^2 + r^2)^{1/2}$$

We know that $m$ is a distance through which the wave front must travel in order to reach point R. Therefore the phase angle through which the wave has passed when it reaches point R will be $\theta$ where $$\theta = B + \frac{m 2\pi}{\lambda}$$

or $$\theta = B + \frac{(h^2 + r^2)^{1/2} \cdot 2\pi}{\lambda} \quad (1)$$

where B is a constant angle and will depend upon the time chosen to take the measurement (or the phase shift in the reference signal)

Plotting the sine of the angle along a radial line from point P produces a phase-distance waveform similar to that shown on FIG. 3. In fact, FIG. 3 is obtained from the equation $$a = A \sin \beta + \frac{(h^2 + r^2)^{1/2} \cdot 2\pi}{\lambda} \quad (2)$$

plotted for values of $r = P$ to $r = R$ (where A is the peak amplitude of the wave)

Equation (2) resembles a "swept frequency" waveform where the increase of frequency with $r$ follows a hyperbolic curve. Inspection of this formula shows that if B and $\lambda$ are constants. The only factor that will change the rate of increase with $r$ will be $h$. $a$ is defined to be the instantaneous amplitude of the waveform at location $r$.

It will be evident that if in (1) we know $\lambda$, $r$ and $\beta$, we are able to measure $\theta$. Then provided that we know the position of P and the number of complete cycles from P to R, we will be able to calculate the distance $h$. Unfortunately, the single source case is unlikely to occur in practice and the correlation method we describe later becomes necessary. In the most useful applications the observation will include the sum of many wave fronts and will be accompanied by a high background noise. Under these conditions the correlation method is essential.

In the case of echo ranging, the sum of many wave fronts reflected from several objects may be received. This can be considered as the result of several image point sources simultaneously radiating waves with the same frequency. The problem is to locate the individual sources using the information contained in the interference pattern of the wave fronts. (It is a relatively simple matter to find the position of a reflector with the aid of geometry once the image point is located).

FIG. 4 is a simplified diagram representing the case where a spherical source at point O propagates a wave which is reflected from plane surfaces $R_1$, $R_1'$ and $R_2$, $R_2'$.

The two waves arriving back at the surface SS' will appear to originate from the image points $O_1'$ and $O_2'$. (For the time being we disregard the direct wave arriving from O. Although, in some applications, this will serve as a useful reference wave it will more often be an unwanted interference. Methods of reducing the direct wave will be explained).

FIG. 5 represents the standing-wave pattern or instantaneous amplitude contours of the two separate waves arriving from the image points $O_1'$ and $O_2'$, as viewed from above the surface SS'. $P_1$ is a point on a line perpendicular to the surface and passing through the image-point $O_2'$; $P_2$ is on a similar line with $O_2'$. It will be appreciated that the line $P_2P_1O$ would not necessarily be a straight line in practice.

The wave fronts will interfere, and by cancellation and reinforcement, will produce a pattern no longer recognizable as the two sets of concentric rings shown on FIG. 5. However, by the following methods we are able to compute the positions of $P_1$ and $P_2$ and subsequently find the distance to their image points.

A correlator-filter is ideally suited for the method of this invention Cross-correlating the incoming signal (that is, the constant-frequency signal plus noise) with a long time sample of the transmitted waveform, provides a filter whose Q is proportional to the length of the integration time. For an example, if we select an integration time of 10 seconds the Q at 100 Hz. will be 1000. Of course, any method of filtering giving suitable selectivity may be used.

It is an important feature of this invention that, because we are dealing with a constant frequency signal, it is relatively simple to select the signal from noise.

In its general form a system for performing the method of the invention will consist of:

1. A means for transmitting a constant frequency signal through the medium to be explored. This may be a resonant transmitter driven from a standard-frequency source.
2. A means for detecting a direct arrival or a reflection of the transmitted signal.
3. A means for filtering the signal from the background noise. In order to take advantage of the constant frequency signal, this is a resonant filter with high Q or alternatively it could be a correlator filter with a long integration interval.
4. A means for measuring the peak amplitude, A, and the phase, $\theta$, (relative to the transmitter frequency phase) on a line or plane cutting across the wave front. The position and distance between the points at which the readings are taken being accurately recorded.
5. A means for calculating and listing the instantaneous amplitude of the wave front corresponding to the correct position on the area, or line of observation. The instantaneous amplitude $a$ being found from the relationship, $a = A \sin \theta$ where A = the peak amplitude of the signal $\theta$ = the phase difference between the signal and a reference signal supplied by the transmitter.

Alternatively, an amplifier having a synchronous rectifier or detector that is phase locked with the transmitter may be used where the output is given as a DC voltage proportional to the instantaneous amplitude of the wave front.

6. A means for transmitting a reference signal from the transmitter to the detector for the purpose of phase comparison. The delay or phase-shift on this reference signal being constant or having insignificant variation.

This system is necessary for the field requirement and a specific embodiment will be described later. The interpretation of the data obtained will now be considered.

The method of locating the source of the wave front can be performed in at least three ways.

i. Purely by computation using a technique suitable for a digital computer.

ii. By a hybrid method using first an analog device and then a digital computer iii. By a purely analog device designed specifically for this purpose.

3-Dimensional Location

Assume that a remote transmitter is propagating a spherical wave. Assume also that we are able to plot the instantaneous amplitude of the wave on a plane perpendicular to the direction of the wave front. Equal instantaneous amplitude fronts on the plane will appear as a pattern of concentric rings (see FIG. 2). Then, provided that we know the frequency and the velocity of the wave, it will be possible to locate the position of the transmitter relative to the plane by the following method:

1. The source must lie on a line perpendicular to the center of the concentric pattern.
2. The variation of the interval between successive concentric fronts measured on a line radial from its center is a characteristic of the distance from the source. Therefore the distance can be found by cross-correlating the pattern along the radial line with patterns representing known distances.

The method of the invention includes the use of a two-dimensional optical device as correlator using well-known methods of pattern recognition or the amplitude variation along a radial line may be taken and cross-correlated as a waveform. If a purely analog method is desired the source will be located by constructing a scale model of the system giving rise to the observed pattern. The general principle is that the instantaneous amplitude patterns of a wave front contain sufficient information to locate, in 3-dimensions, the source of the wave.

It may be sufficient for some practical purposes to find a wave source in two dimensions only. For example, when the distant source is on the surface of the earth, and it is not necessary to find the elevation, as may be required in position-finding. Or possibly, in seismic echo-sounding, it may be decided to forego the advantage of a 3-dimensional survey in order to speed up the operation. Then it is only necessary to plot the instantaneous amplitude along a line in the path of the wave. A waveform as shown in FIG. 5 is then obtained.

The source of an "inline" observation is found by
1. Cross-correlating a known radial phase-distance waveform with the observed inline pattern shifting along the direction of the line. Maximum correlation can be made to indicate the center point of the pattern and from this we know that the source will be on a position perpendicular to the point.
2. The distance is found by cross-correlating with patterns representing known distances.

These steps 1 and 2 are in practice performed in one operation. The known pattern is selected and cross-correlated for a complete range of inline shifts. This is then repeated for another known pattern and so on until the correlogram showing the best match is obtained.

An apparatus suitable for performing the method of the invention is shown diagrammatically in FIG. 6. The apparatus includes a vibrator unit 13 and a receiving unit 12 which can be arranged on a mobile carrier so that it can be moved over the survey area. Because the method of the invention contemplates the surveying of a standing wave pattern, it is possible to set up the vibrator unit at a convenient point in the survey area and move the mobile receiving unit over the area at the operator's convenience. The use of the standing wave pattern allows the receiving unit to be used to give a relatively coarse estimate of the strata configuration or a more detailed examination of a particular stratum or strata and also investigation of local anomalies can be performed in a simple manner.

The ground surface SS' has a resonant vibrator 1 on it which emits a constant frequency signal which is reflected by a stratum RR'. The vibrator, which acts as an auxiliary source, is driven by an amplifier 2 and a preset oscillator 3. The signal travels from the vibrator unit to the receiving unit by three paths. The first path is the reflected wave from the stratum RR' and this wave is detected by a pair of detectors 10, 11. The second method of travel is the direct wave which follows the surface SS' and wave front. order to attenuate this direct wave the detectors are positioned so that they are spaced apart a distance of ½λ so as to attenuate the direct wave, which otherwise may cause destructive interference. The third method of travel is by radio signal and it is by this means that the reference is transmitted to the receiving unit 12. The detector 4 in the vibrator unit detects a reference signal and is positioned as close as possible to the vibrator unit 1. It is also possible to take the reference signal from the power amplifier 2 direct to the radio transmitter 5. A phase shift may occur in the coupling between the vibrator 1 and the ground, and it is therefore preferable to take the reference signal from a ground-contacting detector. The radio transmitter 5 transmits the signal to the receiver 6 which passes the amplified signal to a synchronous rectifier 7. The synchronous rectifier 7 samples (at a repetition rate determined by the reference signal) the signal obtained from the filter to measure the instantaneous amplitude. The signals received from the detectors 10 and 11 are added to obtain the sum of the two signals and passed to a filter 9 in which the added signals are also amplified. The output from the rectifier 7 is a voltage proportional to the instantaneous amplitude $a$ of the signal obtained from the filter 9.

The mobile unit is moved over the survey area covering a prearranged path and records the instantaneous amplitude of the reflected wave over this path. At each observation point three items of information will be recorded.

1. The coordinates of the observation position which can conveniently be made by a grid reference.
2. The instantaneous amplitude $a$.
3. The polarity of the signal.

The readings from 1, 2 and 3 are recorded on magnetic tape or punch cards in a recorder 8, which may be of digital form. The use of several receiving units will of course allow a more rapid survey to be performed.

Returning now to FIG. 5 in which the wave fronts emitted by two planes are shown it is noted that the wave fronts from each source have a pattern peculiar to only one distant image point (O). Therefore it is possible to make a two-dimensional cross-correlation with a set of known depth patterns in order to find both the position of points $P_1$ and $P_2$ and the depth to their image points. It will be appreciated that the invention utilizes the principle that the source of a wave may be found from the information contained in the wave front.

It is also possible, and more convenient for digital processing, to find the position of points $P_1$ and $P_2$ by a method of circular scanning which will be described later. Using the data obtained in this way we are able to find the distance to the image points by cross-correlation. The principle remains the same, in that we find the distance to a remote source by determining the shape of the wave front.

The circular-scan method is better understood if we first consider what constitutes a recording of an interference pattern and how we are able to plot an instantaneous wave front.

The transmitter at point O in FIGS. 4 and 5 is radiating a sound wave, and the area of the surface SS' has been divided into a grid so that we can pinpoint a large number of observation points, separated from each other by a distance less than half of the shortest wavelength present.

A detector placed on one of the observation points will (in the absence of noise) give a constant frequency signal whose amplitude is the vector sum of the reflected and reference signals. It is assumed that the transmitter has been radiating for a period long enough for the signals to reach a steady state.

The phase difference $\theta$ between the signal detected by the receiving unit and the signal emitted by the vibrator unit will be equal to:
a. The phase shift due to the time delay along the travel path from the transmitter to the detector, and
b. The phase angle resulting from the sum of the two waveforms originating from the two image points.

If the peak amplitude of the received signal is A, then the instantaneous amplitude $a$ is found by the equation $$a = A \sin \theta$$

FIG. 7 shows a grid on which can be entered a block of instantaneous amplitude numbers; these numbers are obtained by computing the wave fronts of two image points from a theoretical model. The numbers would indicate the value of the instantaneous amplitude at the intersection of the grid lines. In practice the polarity of the signal would be indicated by, for example, red or blue ink. Alternatively, there may be some other means of showing the polarity, such as an additional indicator digit on the number. A polarity indication of this type would be necessary for digital or other computer-type processing. The numbers indicating the instantaneous amplitude would be inserted at the grid intersections corresponding to the observation points.

FIGS. 8 and 9 show another method of illustrating a wave front. In both of these diagrams the area of the blocks indicate the magnitude of the wave and the shading indicates polarity. It would also be possible to construct a pattern of blocks with equal area and vary the density of shading according to the amplitude. In this case, the polarity would be indicated by choosing a particular grey density as zero. The position of a wave front may be located by correlating the purely optical presentation (for example, the block pattern shown in FIG. 8 or 9) with a set of known masters computed for possible wave fronts originating from origins of known depth.

However, the circular-scan method already referred to will be more suitable where the data is to be processed digitally. Thus after recording the information bits the circular scan is performed by the computer.

The object of the circular scan is to
1. Locate the center of a wave front pattern when it is hidden by noise or other interfering waves, and
2. To identify the phase-distance waveform precisely so that it may be cross-correlated with known phase-distance waveforms in order to find the distance to the wave source.

FIG. 10 represents part of an observation shown on FIG. 7. The circular tracks $a_r=1$ to $a_r=7$ indicate the path of a sequential scan; track $a_r1$ being the first scan and track $a_r2$ the second and so on.

The readings falling in the path of track 1 are algebraically summed and divided by the total number of readings. This operation determines the algebraic mean of all readings in the track. In this way the mean amplitude corresponding to one radial position of a circular scan is obtained. This is then stored, or plotted as shown on FIG. 10, and the operation is repeated on tracks $a_r=1$ to $a_r=7, 2, 3, 4$ etc.

When the point chosen for the center of a scan corresponds with the center of a wave front pattern, the mean amplitudes will represent the instantaneous amplitudes of the phase distance waveform of the pattern. If the point chosen for the scan is not in the center of a pattern the amplitudes will be reduced or tend to zero.

One method of identifying a waveform resulting from a pattern is by plotting the sum of the square of its amplitudes as follows:

If $a_1, a_2, a_3 ..... a_n$ represent the amplitudes obtained from a circular scan, then the quantity W where $$W = a_1^2 + a_2^2 + a_3^2 ..... a_n^2$$

will be a maximum when we locate the center of a wave front pattern. Thus the quantity W is a power parameter because it is a function of the square of the amplitude.

FIG. 11 shows a 3-dimensional plot of W against the two ordinates of a set of observations. This is a practical example where the position of one wave front is selected from the interference pattern of two waves.

The circular scan may be carried out in a digital computer using a programme designed to select the ordinates appropriate to the scan; or it may be drafted and operated upon manually; alternatively an analog device may be constructed specifically for this purpose.

Having located the point P on the plane S–S' that is closest to a source O', the next task is that of determining the distance $h$ from the plane S–S' to the virtual source O' (see FIGS. 1 and 2).

The curve shown on FIGS. 3 and 10, the phase-distance waveform, is the instantaneous amplitude of a wave front along a radial line perpendicular to the direction of the wave.

Assuming that the frequency of the wave is constant and its velocity does not change, there will be a unique phase-distance waveform for every distance to the source. It is as if the waveform were a code giving the distance. All we need do to decipher is compare the curve with a set of curves of known origin until we find a perfect match.

We have already shown that the phase-distance waveform can be found by solving the equation:

$$a = A \sin \beta + \frac{(h^2 + r^2)^{1/2} 2\pi}{\lambda} \qquad (2)$$

where
A is the peak amplitude of the wave
$\beta$ is a constant phase angle
$\lambda$ is the wavelength
$h$ is the distance to the source
$r$ is the radial distance from the center of the wave front.

Thus we have a means of calculating the variation of $a$, with $r$, for any number of distances $h$, we choose. It follows that if we are given an unidentified phase-distance waveform (and we know $\lambda$ and the values of $r$) then we may use equation (2) to generate waveforms and compare them with the unidentified waveforms until we find the best match. The value of $h$ giving the best match will be the distance to the source of the wave. It is well known that one of the most sensitive ways of comparing two waveforms is by cross-correlation; this is the means we propose to use here when the source is located purely by computation.

Equation (2) defines a wave front arriving from a single source. When echo-sounding, however, we will expect to find that the observation contains several wave fronts arriving simultaneously from several image points at various distances.

If we write equation (2) as a function, $g$, of radial distance $r$ and perpendicular distance $h$ thus $$a = g(r,h): ..... (3)$$

then the sum of several wave fronts with their origins at various distances may be written as follows:

$a_0 = g(r,h_1) + g(r,h_2) ..... g(r,h) .....(4)$ where $a_0$ is the instantaneous amplitude of the observation at a distance $r$ from point P.

In effect, the observation is the sum of several swept-frequency waveforms and we have the task of separating and identifying each one.

Cross-correlating the observation with the waveform calculated for a single image-point (defined by equation 2) for all values of $h$ likely to be of interest will give a correlogram indicating the distance to the various sources.

In other words, if the symbol for cross-correlation is given as $Q_{oon}$ then $$Q_{oon} = \frac{1}{R} \int_{r=0}^{r=R} g(r,h) \cdot [g(r,h_1) + g(r,h_2) \cdot \cdot \cdot g(r,h_n)] dr$$

The solution of this for one value of $h$ in the first term provides a single point on the source-point/depth chart. A complete chart is plotted by recalculating for as many values of $h$ as is necessary to explore the required depth. FIG. 12 is a correlogram showing the distance of two remote sources, one at 3,000 feet and the other at 4,100 feet. The data was obtained from a theoretical model where
$\lambda = 50$ feet
$R = 6,000$ feet The results from the two sources were superimposed and then cross-correlated to obtain results from each virtual source using a linear scale pattern from each depth. As mentioned previously $\beta = 0$ in FIG. 3 and this causes FIG. 12 to show the main peaks as vertical.

The invention is applicable to a source (real or virtual) which emits a constant signal containing a constant frequency. In the seismic exploration case which has been described the signal emitted by the auxiliary source contains only a single frequency which sets up a standing wave pattern on the ground surface. Any spurious frequencies will be filtered from the frequency being measured in the standing wave pattern.

A method according to the invention will now be described in which a real source emits a sound wave having frequencies extending over a spectrum. A particular frequency is selected by suitable filtering means and measured.

In FIG. 15 a water pipe 16 running under a surface SS' has a leak at position 17, as the water leaves the pipe under pressure a sound is emitted having a frequency spectrum. With the aid of suitable filters the position 17, which it is desired to detect, is a real single source of a constant frequency which is constantly emitted. The correlation method described previously is applicable to detect the position 17 by monitoring the standing wave pattern at the surface. This present method differs from that previously described because:

1. The "high Q" filter (or correlator filter) is now essential and the integrating interval must be considerably longer than the traveltime of the sound wave.
2. The reference signal must be taken from some point on the surface of the ground.

A detector 9 placed at some arbitrary position O on the surface provides the reference signal. The filter 12 is tuned to a frequency $F_1$ (say 500 Hz. and the filter delay is 2 seconds).

The filter 11 is identical with 12 and is also tuned to the frequency $F_1$.

The output from the detector 10 is filtered by 11 and the output from the detector 9 is filtered by 12. Both signals are amplified and the phase difference is measured in the phase comparator 15. The output from the phase comparator is arranged to be the sine of the phase difference multiplied by some constant peak amplitude A.

The crosses on the line SS' represent equally spaced observation points on the surface.

We locate the source in two dimensions as follows:

The detector 10 is placed on the observation point −4 (although it is shown in FIG. 13 as on point −3) and the sine of the phase difference is plotted on the −4 point of a graph as shown on FIG. 14. This is repeated on all positions through to number 8 so that we have a curve showing the variation of A sin $\theta$ along the line SS'. The curve will be symmetrical about a position on the surface SS'. This tells us that the noise source lies on a plane cutting through the point of symmetry and perpendicular to the surface (on a plane perpendicular to the diagram on FIG. 13). To find the position in the Z direction (through the paper on FIG. 13) we take a similar set of observations in the transverse directions.

FIG. 15 represents a plan view of the observation points. The position of the water pipe below the surface is indicated by the parallel dotted lines, and the position of the leak by the point 17.

The reference detector 9 is moved from observation point 0 to 1 on the $x$ axis and the sine of the phase angle is plotted as before only this time along the Z axis.

FIG. 16 shows that the point of symmetry occurs near position 2. This tells us that the leak lies on a line perpendicular to the surface below position 2.

Assuming that we know the velocity of the sound wave through the ground, then it is possible to find the depth to the noise source as follows:

On FIG. 16, let the phase at Z=2 be $\theta_1$ radians.

Then at some distance $r$ along the Z axis the phase is $\theta_1 + 2\pi$ radians (or in other words, we find the distance $r$ to a 360° phase change). The depth $h$ can then be found from the equation $$h = r^2 - \lambda/2\lambda$$

This may be checked by moving out to a new position $r_1$ where the phase is $\theta + 4\pi$ and solving $$h = r_1^2 - \lambda^2/4\lambda$$

This gives the distance to the noise source on a line perpendicular to the surface. When the surface is sloping a simple geometrical correction must be applied in order to find the true vertical depth.

When the noise signal from the source is obscured by a high background interference it will not be possible to recognize the waveform shown on FIGS. 14 and 16. Under these conditions the instantaneous amplitude of the wave front will be plotted over an area on the surface and the source will be found by the circular-scan and correlation technique.

The waveform on FIG. 16 resembles a swept frequency wave and may be correlated with a master waveform to determine the vertical and horizontal distances from position 17.

The method of the invention is applicable to the detection of other real sources which emit a continuous signal containing a constant frequency, for example the noise signal emitted by an arcing electric cable.

The correlation techniques described with reference to the seismic method may be applied to this method of detecting real sources when the information is presented in the required optical or digital form.

The method of the invention has been described with reference to sound waves but it is also applicable to radio and ultrasonic frequencies. The method may be utilized for sounding the ionosphere.

With radio waves the wave pattern is more easy to identify because the velocity is more constant with length of path.

I claim:

1. An apparatus for use in the determination of the position in a medium of one or more spherical wave sources emitting a constant signal containing a constant frequency comprising in combination:
   a. Means for transmitting a constant frequency signal through the medium;
   b. Means for detecting a reflected signal;
   c. Means for detecting a reference signal from the transmitter;
   d. Filter means for filtering the reflected signal from noise;
   e. Means for measuring the amplitude and phase relative to the reference signal of the reflected signal at observation points on a line or plane cutting the wave front; and
   f. Means for measuring instantaneous amplitudes as the amplitude of the reference signal multiplied by the sine or cosine of the phase difference between the reference and reflected signals plus or minus an arbitrary constant angle, and for recording the instantaneous amplitudes at the observation points.

2. The apparatus of claim 1 wherein the instantaneous amplitude measuring means and the amplitude and phase measuring means comprises a synchronous detector which gives a direct voltage output proportional to the instantaneous amplitude of the wave front.

3. The apparatus of claim 1 wherein the reference signal is detected by a medium contacting detector adjacent the transmitting means.

4. A machine implemented method for locating the point in a plane closest to a source of spherical waves, said method comprising the steps of:
   determining instantaneous values of the waves along two nonparallel lines in the plane;
   examining the instantaneous values along each line and finding points of symmetry about which the lines can be rotated 180° without altering the instantaneous values;
   constructing two new nonparallel lines each of which passes through the point of symmetry on and is perpendicular to one of the two nonparallel lines; and
   selecting the point of intersection of the two new lines as the point closest to the source.

5. A machine implemented method for locating a point in a plane that is closest to a source of spherical waves, said method comprising the steps of:
   determining instantaneous values of the waves along a first line in the plane;
   examining the instantaneous values along the first line and finding a first point of symmetry about which the first line can be rotated 180° without altering the instantaneous values;
   constructing a second line in the plane perpendicular to the first and passing through the first point of symmetry;
   determining instantaneous values of the waves along the second line;
   examining the instantaneous values along the first line and finding a second point of symmetry about which the second line can be rotated 180° without altering the instantaneous values; and selecting the second point of symmetry as the point closest to the source.

6. A machine implemented method of finding points in a plane which are closest to one or more sources of spherical waves all having the same frequency and wavelength, said method comprising the steps of:

determining instantaneous values of the waves over an area in the plane;

for each of a plurality of points within the area averaging the instantaneous values over a plurality of circular paths having differing radii and all cocentric about the point as their center, squaring the average values for each path, and summing the squares; and selecting those points at which the sums of the squares are maximized as the points closest to the sources.

7. A machine implemented method for finding the distance between a single source of spherical waves and a line along which instantaneous values of the waves are known, comprising the steps of:

examining the instantaneous values along the line and finding a symmetry point about which the line can be rotated 180° without changing the instantaneous values;

selecting a second point on the line from among those points at which the phase of the wave matches the phase of the wave at the symmetry point, said second point being the closest such point to the symmetry point; and calculating the distance $h$ to the source by the following formula $$h = r^2 - \lambda^2 / 2\lambda$$

where $r$ is the distance between the symmetry point and the second point, and where $\lambda$ is the wavelength of the spherical waves.

8. A machine implemented method for locating one or more single frequency virtual sources of spherical waves located on a first line comprising the steps of:

measuring instantaneous values of the waves along a second line perpendicular to and intersecting the first line;

calculating sets of instantaneous values that would be generated by a single virtual source located along the first line at varying distances from the second line;

cross-correlating the instantaneous values of the waves measured along the second line with each of the calculated sets of instantaneous values, thereby giving rise to cross-correlations corresponding to the various distances; and selecting those distances which maximize the cross-correlation as the distances between the sources and the intersection of the first and second lines.

9. A machine implemented method of locating the position of single frequency virtual sources of spherical waves, said method comprising the steps of:

measuring the instantaneous values of the waves over a plane surface;

for each of a plurality of points in the plane surface, averaging the instantaneous value along one or more circular arcs about the point and squaring and summing the average instantaneous values for each point;

selecting from the plurality of points maximum points whose locations maximize the sums of the squared average values;

for each maximum point so selected, cross-correlating the maximum point average values with a plurality of instantaneous value waveforms each representing the waveform produced along a line by a source located a specified distance from the line;

for each maximum point so selected, selecting the correlation maximizing distances whose instantaneous value waveforms maximize the cross-correlation; and selecting as source positions all points directly opposite the maximum points and spaced the corresponding correlation maximizing distances from the plane surface.

10. A machine implemented method of locating the position of single frequency virtual sources of spherical waves, said method comprising the steps of:

measuring the instantaneous values of the waves over a plane surface;

calculating the instantaneous values which would be caused by virtual sources located at a plurality of locations, thereby obtaining a plurality of calculated instantaneous value sets;

cross-correlating each of the calculated instantaneous value sets against the measured instantaneous values; and selecting as virtual source locations those locations whose calculated instantaneous value sets maximize cross-correlation.

11. A machine implemented method of determining the position in a medium of one or more sources of spherical waves emitting a continuous signal containing a constant frequency in which the spherical wave is detected at observation points along a line of traverse and an instantaneous amplitude at each observation point is measured as the sine or cosine of the phase difference between the received spherical wave phase angle at the observation point and the phase angle of a reference signal containing the constant frequency plus or minus an arbitrary constant angle, and then correlating the waveform defined by the instantaneous amplitude values along the line with a series of instantaneous amplitude waveforms constructed from known source positions to determine the constructed waveforms giving optimum correlations.

12. A method as claimed in claim 11 in which the line of traverse is straight and lies on the interface between the medium and a second medium, in which the reference signal contains only the constant frequency, and in which the instantaneous amplitude is measured by measuring the peak amplitude at an observation point and the phase at that point relative to the reference signal.

13. A machine implemented method of determining the position in a medium of one or more sources of spherical waves emitting a continuous signal containing a constant frequency in which the spherical wave is detected at an array of observation points on an area and an instantaneous amplitude at each observation point is measured as the sine or cosine of the phase difference between the received spherical wave phase angle at the observation point and the phase angle of a reference signal containing the constant frequency plus or minus an arbitrary constant angle, and then correlating the two-dimensional wave pattern defined by the instantaneous amplitude values over the area with a series of wave patterns constructed from known source positions to determine the wave patterns giving optimum correlations.

14. An apparatus for locating virtual sources of constant frequency spherical waves induced opposite discontinuities by radiations from a real source of constant frequency radiation comprising:

A reference signal that is phase locked with the constant frequency radiations;

A mobile detector which detects the spherical waves, comprising two wave detectors located one-half wavelength apart and generating output signals that are summed to form a detector signal, whereby direct radiation from the real source is not detected whenever the two wave detectors are on a line which passes through the real source;

A frequency selective, high Q filter through which the detector signal is passed and which filters out noise and interference;

Phase comparison means receiving as inputs both said reference signal and said detector signal and generating a third signal whose amplitude is equal to the peak amplitude of the detector signal multiplied by the sine $(\theta + \beta)$, where $\theta$ is the phase difference between the reference signal and the detector signal and $\beta$ is an arbitrary constant;

Recording means for recording the amplitude of the third signal along with the location of the mobile detector; and Means for transporting the mobile detector to a plurality of locations and for actuating the recording means at each location.